Feb. 2, 1960     L. F. MOTT     2,923,159
APPARATUS FOR INDICATING THE DENSITY OF
LIQUID FLOWING THROUGH A PIPE

Filed Nov. 30, 1956     5 Sheets-Sheet 1

INVENTOR:
LAWRENCE FARNELL MOTT
By
Richardson, David and Nordon
Att'ys.

Feb. 2, 1960 L. F. MOTT 2,923,159
APPARATUS FOR INDICATING THE DENSITY OF
LIQUID FLOWING THROUGH A PIPE
Filed Nov. 30, 1956 5 Sheets-Sheet 4

INVENTOR:
LAWRENCE FARNELL MOTT
By
Richardson, David and Nordon
ATTY's.

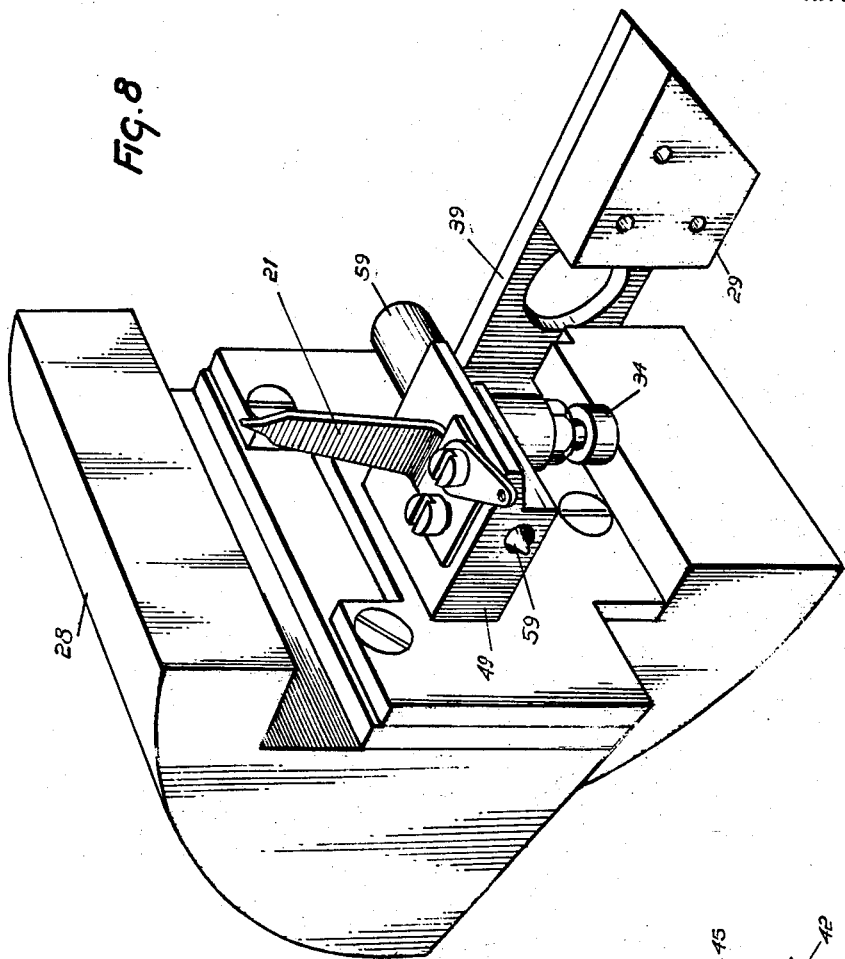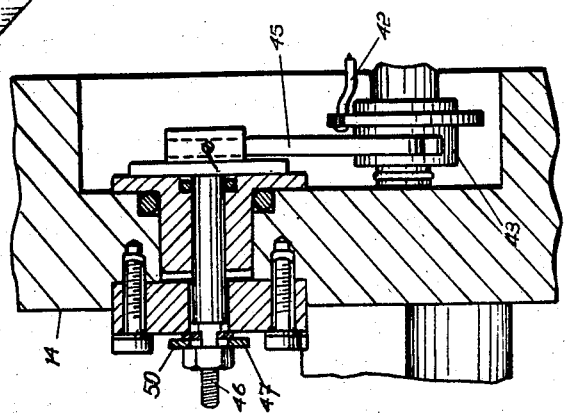

United States Patent Office 2,923,159
Patented Feb. 2, 1960

2,923,159

APPARATUS FOR INDICATING THE DENSITY OF LIQUID FLOWING THROUGH A PIPE

Lawrence Farnell Mott, Wolverhampton, England, assignor to H. M. Hobson Limited, London, England, a company of Great Britain Application November 30, 1956, Serial No. 625,271

5 Claims. (Cl. 73—452)

This invention relates to apparatus for indicating the density of liquid flowing through a pipe.

A liquid density monitor is known which consists essentially (Figure 1) of a float attached to an arm which is pivoted at its other end, the axis of the pivot being substantially horizontal. The float and arm have a certain mass which can be represented as being concentrated, on a radius lying approximately 45° below the radius on which the centre of buoyancy of the float lies.

The device is designed so that when immersed in a liquid having a density in the middle of the range of density changes that it is desired to indicate, the angle subtended between a radius $r_1$ from the pivot through the centre of buoyancy of the float is approximately 90° to the vertical, and a radius $r_2$ passing from the pivot through the centre of mass of the float and arm is approximately 45° to the vertical. Under these conditions, the equilibrium of the system is represented by the equation:

$$\frac{B.r_1}{g} \sin \theta_1 = \frac{W.r_2}{g} \sin \theta_2$$

$B$ = buoyancy force,
$W$ = effective weight at centre of mass,
$\theta_1$ = angle or $r_1$ to the vertical ($\theta_0$),
$\theta_2$ = angle of $r_2$ to the vertical = ($\theta_1$–45° approx.),
$g$ = acceleration in the direction $\theta_0$.

Changes of density of the liquid will cause proportionate changes in the moment represented by the left-hand term of the equation, which will be counteracted by an equal change in the right-hand term. If the immersed mass is made of a substance having a high density in relation to the density of the liquids, e.g., a heavy metal, and the liquid is less dense than water, e.g., is a hydrocarbon fuel, then the change in the value of W in the right-hand side of the equation will be small and the term $\sin \theta_2$ will alter proportionally to the change of density.

Thus, for any particular float-mass system, the angle $\theta_1$, which bears a constant relation to $\theta_2$, will be a measure of the density of the liquid, within a certain range on either side of the density which satisfies the equilibrium equation. For any chosen value of the angle $\theta_1$–$\theta_2$ the density is a unique function of the angle $\theta_1$.

This relationship is unaffected by changes in the magnitude of the acceleration $g$ since the buoyancy B and effective weight W are both proportional to $g$. If $g$ is zero then both sides of the equation are zero and the angle $\theta_1$ has a random value. The relationship therefore holds only when $g$ has a finite value.

For a density monitor fixed relative to the earth, angle $\theta_1$ can be measured relative to a known vertical, but if the monitor is required to operate in a moving vehicle subject to change of velocity, a reference may be provided in the form of a pendulum which may conveniently be pivoted upon the same axis as the float/mass system, $\theta_1$, is then the angle between the two.

Where, however, a pendulum is used to provide the reference, changes in the radial direction of the acceleration $g$, occasioned by changes in the speed and attitude of the vehicle, will cause transient variations in the angle $\theta_1$ between the float/mass system and the pendulum unrelated to density changes. This is because the time of re-orientation to a changed direction of $g$ cannot be similar at all angles of change for both the float/mass system and the reference pendulum.

To overcome this, it is proposed according to the invention to employ two similar float/mass systems pivotably mounted on a common horizontal axis and arranged on opposite sides of a vertical plane containing the axis so that one system is substantially a mirror image of the other system. The angle between the two systems will then provide a measure of density. The relative angular movement per degree of density change will be twice that obtained from the single float/mass system, and for similar means of indication, e.g., an electrical potentiometer and a co-operating slider, since twice the movement is available, the friction moment, and hence the inaccuracies due to friction, will be halved also.

Two embodiments of the density monitor are described in more detail below, with reference to the drawings.

Figure 7 is a section on the line VII—VII of Fig. 4, Figure 8 is a perspective view of one of the float/mass systems.

In the figures, i.e., in Figures 2 to 8, like reference numerals indicate like parts.

Figure 1:
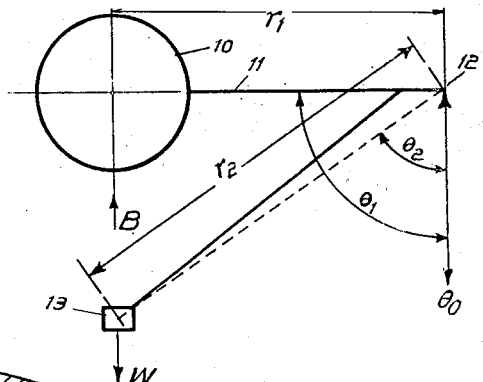
Figure 1 is a diagrammatic view of a known liquid density monitor.
Figure 2:
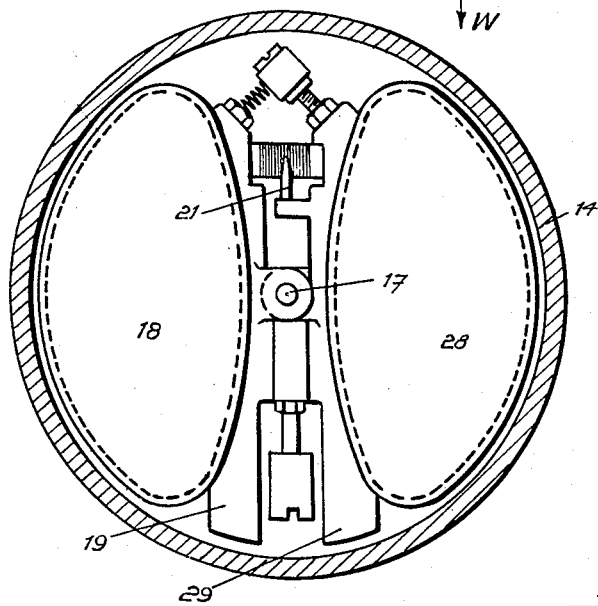
Figures 2 and 3 are diagrammatic sectional views in planes at right angles to one another, of the first embodiment.
Figure 3:
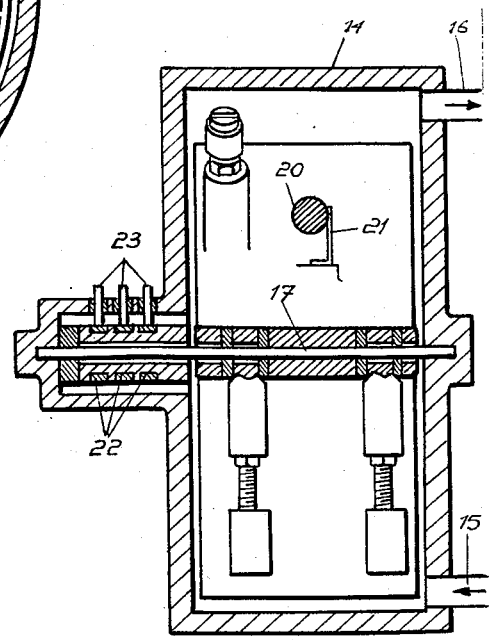

The apparatus shown diagrammatically in Figs. 2 and 3 comprises a cylindrical casing 14, into which liquid enters at 15 and from which liquid flows out at 16. Pivoted at one side of a central spindle or shaft 17 are a hollow float 18 and associated weight 19, and pivoted at the other side of the spindle are a hollow float 28 and associated weight 29. The float 18 carries a potentiometer 20, with which co-acts a slider 21 carried by the float 28. Electrical connections are made to the two ends of the potentiometer and to the slider by slip rings 22 and brushes 23.

The available E.M.F. picked off from the potentiometer 20 by the slider 21 can be used to adjust the position of a pointer or to modify the indication of a mechanical, hydraulic or electro-hydraulic flowmeter, e.g., of a known flowmeter.

In an alternative form, a mechanical linkage can be displaced by a change in the angle between the two float/mass systems to derive therefrom the required density indication.

Figure 4:
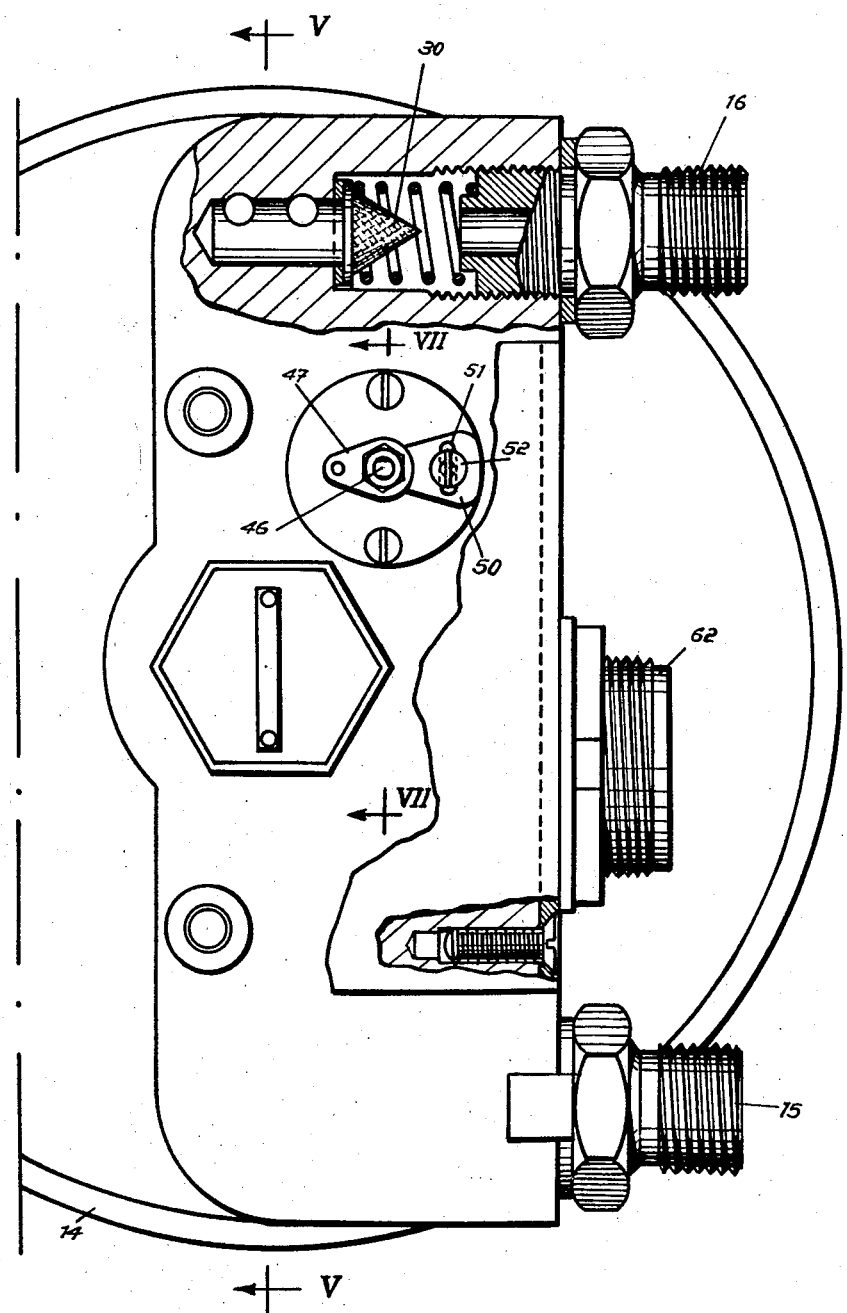
Figure 4 is an end elevation of the second embodiment.
Figure 5:
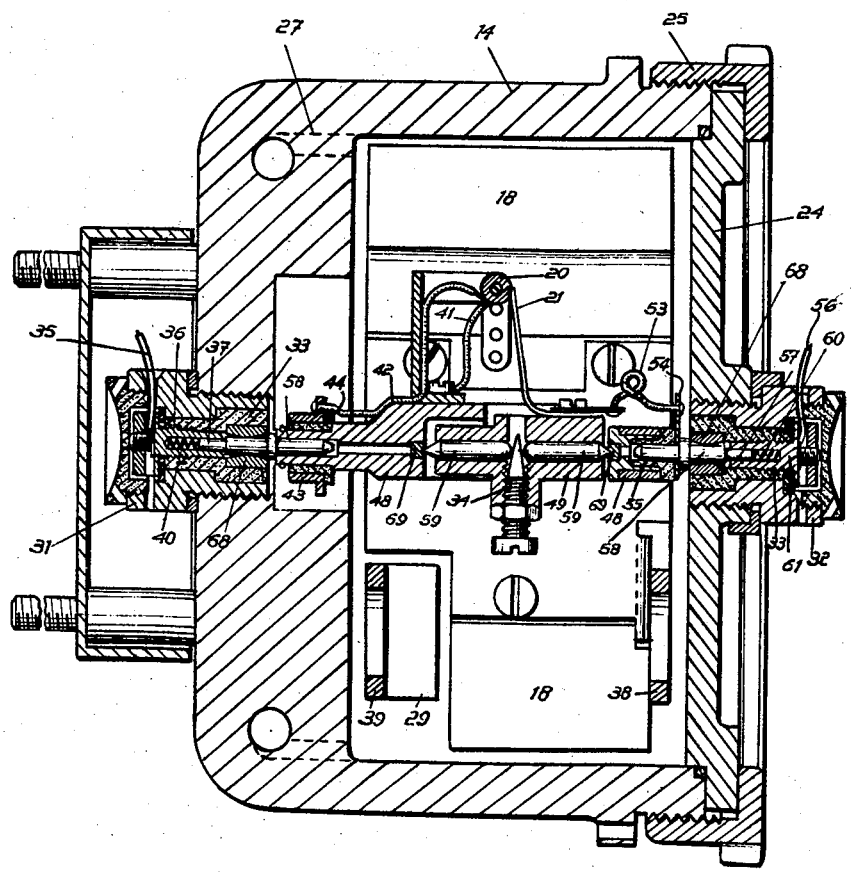
Figure 5 is a section on the line V—V of Fig. 4.
Figure 6:
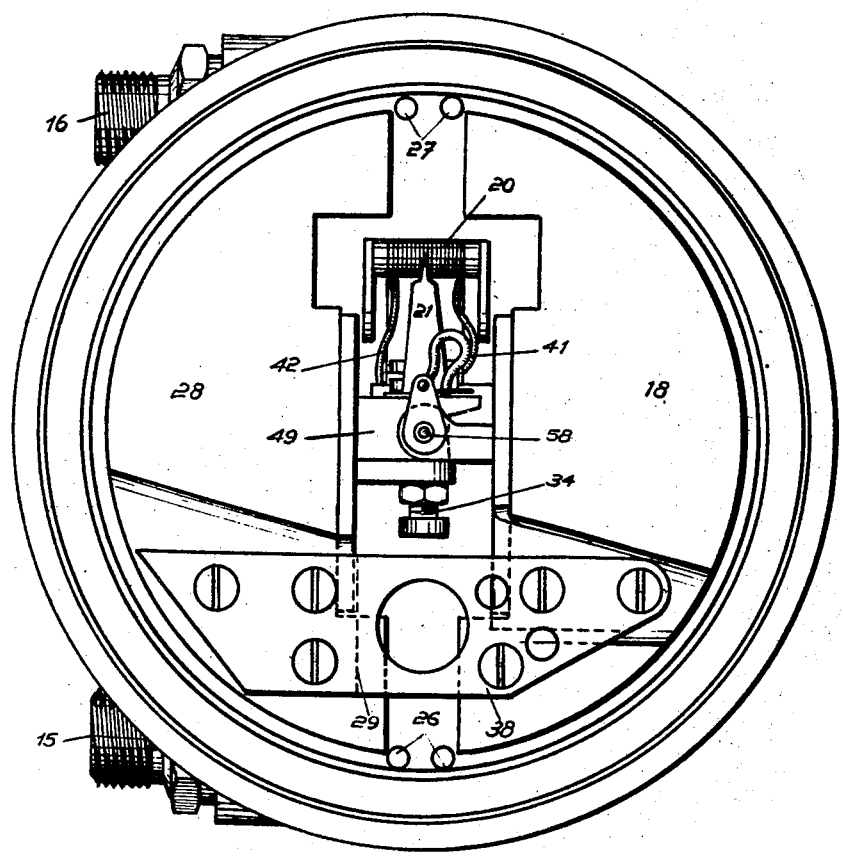
Figure 6 is a view looking from the right-hand side of Fig. 5 with the end cover removed.

Figs. 4 to 8 show a practical form of the density monitor illustrated diagrammatically in Figs. 2 and 3. The casing 14 has a detachable cover 24 (Fig. 5) held in position by an internally threaded locking ring 25. Liquid entering the casing through the inlet 15 flows into the interior of the casing through a passage 26. The liquid flows out to the outlet 16 through a passage 27 and a filter 30 (Fig. 4).

The floats 18 and 28 are solid and made of nylon and the weights 19, 29 are attached to them by bars 38, 39 respectively, each of which is screwed at its opposite ends to the float and the weight as shown. The floats are pivotally mounted on a common horizontal axis by means of jewel bearings as will now be described. The float 18 carries a forked boss 48 (Fig. 5), into which are fitted metal spindles 58 engaging in sleeve jewel bearings 68 supported by bushes 33 of insulating material housed in plugs 31, 32 which are respectively screwed into the end wall of the casing 14 and into the cover 24. The float 18 carries a boss 49, into which are fitted spindles 59 having pointed ends engaging in conical jewel bearings 69 supported by the boss 48 on the float 18. An adjusting screw 34 is provided between the spindles 59.

The potentiometer 20 is supported by the float 18. Current is supplied to one end of the potentiometer through a lead 35 a metal plug 36 screwed into the left-hand insulating bush 33 (Fig. 5), a carbon brush 37 pressed against the left-hand spindle 58 by a spring 40, the boss 48 and a lead 41. The other end of the potentiometer 20 is connected by a lead 42 to a slip ring 43, mounted on an insulating bush 44. A brush 45 (Fig. 7) co-acts with the slip ring 43, the brush being mounted on a pin 46 carrying a terminal tag 47 (see also Fig. 4). The outer end of the pin 46 is flattened and carries a plate 50, having an arcuate slot 51 (Fig. 5) engaged by a screw 52. By slacking the screw 52 and rotating the plate 50, the pressure of the brush 45 against the slip ring 43 can be adjusted.

The slider 21 is mounted on the float 28 and is connected by a lead 53 to a metal plate 54 (Fig. 4) mounted on an insulating bush 55. The plate 54 is electrically connected to a lead 56 through the right-hand spindle 58 (Fig. 4), a carbon brush 57 pressed against the spindle 58 by a spring 60, and a metal plug 61 screwed into the right-hand insulating bush 33.

The electrical connections from the two ends of the potentiometer 20 and from the slider 21 are taken to a common plug connector 62 (Fig. 4) adapted to receive a co-operating socket connector carrying conductors by which the variable E.M.F. picked off from the potentiometer by the slider is applied to a suitable indicator, or to a flowmeter to regulate the same to give indications of mass flow.

What I claim is:

1. A density indicator for liquids, comprising a liquid container, a first float assembly constituted by a float and connected weight immersed in the liquid, a horizontal shaft supported in and across the container, a lever forming part of said assembly and pivoted upon the horizontal shaft so as to assume an angular position corresponding to the density of the liquid in the container, a second float assembly constituted by a float and connected weight immersed in the liquid, a second lever forming part of said second assembly and pivoted upon said horizontal shaft so as to assume an angular position corresponding to the density of the liquid in the container, the two float assemblies being arranged symmetrically about a vertical plane passing through the shaft, and means to indicate the angle between the respective levers of the two float assemblies.

2. A density indicator according to claim 1, including an electrical potentiometer having the resistance element thereof connected to and movable by the lever of one float assembly, a potentiometer slider connected to and movable by the lever of the other float assembly, electrical means connecting the potentiometer to a source of electromotive force, and means for measuring the voltage between a potentiometer terminal and the slider.

3. A density indicator for liquids according to claim 1, in which the liquid container includes a filling opening and a discharge opening for the liquid.

4. A liquid density monitor comprising; two similar float assemblies pivotally mounted on spindles for rotation about a horizontal axis and arranged on opposite sides of a vertical plane containing said horizontal axis, whereby one float assembly is substantially a mirror image of the other float assembly, a casing enclosing said float assemblies, liquid inlet and outlet means for said casing, a removable cover closing said casing, one float assembly having a forked boss, said forked boss carrying spindles engaging sleeve jewel bearings supported respectively by the casing and the cover, the other float assembly having a boss carrying spindle engaging conical jewel bearings carried by said forked boss of the first float assembly, said spindles being coaxial and defining said horizontal axis and means for indicating the angle between the two float assemblies.

5. A density indicator for liquids, comprising a liquid container, a first float assembly constituted by a float and connected weight immersed in the liquid, a shaft supported in and across the container, a lever forming part of said assembly and pivoted upon the shaft so as to assume an angular position corresponding to the density of the liquid in the container, a second float assembly constituted by a float and connected weight immersed in the liquid, a second lever forming part of said second assembly and pivoted upon said shaft so as to assume an angular position corresponding to the density of the liquid in the container, the two float assemblies being arranged symmetrically about a plane passing at right angles through the shaft, means to indicate the angle between the respective levers of the two float assemblies, a cover for the shaft extending across the liquid container, one of the float assemblies having a fork-shaped portion carrying spindles engaging jewel bearings supported respectively by the wall of the liquid container and the cover, the other float assembly having a portion carrying spindles engaging conical jewel bearings carried by a fork-shaped portion extending from the first float assembly.

References Cited in the file of this patent

UNITED STATES PATENTS

| 1,546,702 | Bailey | July 21, 1925 |
| 2,002,184 | Lecarpentier | May 21, 1935 |
| 2,264,487 | Smulski | Dec. 2, 1941 |
| 2,575,616 | De Giers et al. | Nov. 20, 1951 |